(12) United States Patent
Sugiyama et al.

(10) Patent No.: US 7,989,567 B2
(45) Date of Patent: Aug. 2, 2011

(54) METHOD FOR PRODUCTION OF WATER/OIL REPELLENT COMPOSITION AND ARTICLE

(75) Inventors: Kazunori Sugiyama, Tokyo (JP); Yuuichi Oomori, Tokyo (JP); Minako Shimada, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/652,765

(22) Filed: Jan. 6, 2010

(65) Prior Publication Data

US 2010/0105825 A1 Apr. 29, 2010

Related U.S. Application Data

(63) Continuation of application No. PCT/JP2008/062621, filed on Jul. 11, 2008.

(30) Foreign Application Priority Data

Jul. 11, 2007 (JP) ................................. 2007-182397

(51) Int. Cl.
*C08F 2/38* (2006.01)
*C08F 218/00* (2006.01)
*C09K 3/18* (2006.01)

(52) U.S. Cl. ........ 526/224; 526/242; 526/245; 526/246; 526/247

(58) Field of Classification Search .................. 526/224, 526/242, 245, 246, 247
See application file for complete search history.

(56) References Cited

U.S. PATENT DOCUMENTS 6,649,719 B2 * 11/2003 Moore et al. .................. 526/245
2006/0142518 A1 * 6/2006 Qiu et al. ...................... 526/319

FOREIGN PATENT DOCUMENTS

| JP | 10-212305 | 8/1998 |
|---|---|---|
| JP | 2005-272557 | 10/2005 |
| JP | 2006-163094 | 6/2006 |
| WO | 02/083809 | 10/2002 |
| WO | 2004/035708 | 4/2004 |

OTHER PUBLICATIONS

U.S. Appl. No. 12/652,785, filed Jan. 6, 2010, Hirono, et al.

* cited by examiner

*Primary Examiner* — Kelechi C Egwim
(74) *Attorney, Agent, or Firm* — Oblon, Spivak, McClelland, Maier & Neustadt, L.L.P.

(57) ABSTRACT

To provide a method for producing a water/oil repellent composition which can impart water/oil repellency to a surface of an article and has excellent durability (wash durability and heavy-rain durability) and an article which has water/oil repellency and is less susceptible to deterioration of water/oil repellency when it is washed or in heavy rain.

A method for producing a water/oil repellent composition which comprises polymerizing a monomer component comprising the following monomer (a) in coexistence with the following compound (x) in a medium in the presence of a surfactant and a polymerization initiator: monomer (a) is a compound of the formula $(Z-Y)_n X$ wherein Z is a $C_{1-20}$ polyfluoroalkyl group or the like, Y is a bivalent organic group or a single bond, n is 1 or 2, and X is a polymerizable unsaturated group; and the compound (x) is a compound having at least two groups of $-(CH_2)_a-CHR^1-(CH_2)_b-SH$, wherein $R^1$ is a methyl group or an ethyl group, a is an integer of from 0 to 2, and b is 0 or 1.

20 Claims, No Drawings

METHOD FOR PRODUCTION OF WATER/OIL REPELLENT COMPOSITION AND ARTICLE

TECHNICAL FIELD

The present invention relates to a method for producing a water/oil repellent composition, and an article treated with the water/oil repellent composition produced by the method.

BACKGROUND ART

A method of treating an article with a water/oil repellent composition having a copolymer comprising polymerized units derived from a monomer having a polyfluoroalkyl group (hereinafter referred to as a $R^f$ group) dispersed in a medium is known as a method for giving water/and oil repellency to a surface of the article (e.g. a fiber product). Such a water/oil repellent composition is required not to lose the water/oil repellency substantially even when repeatedly subjected to washing (wash durability).

As a water/oil repellent composition with excellent wash durability, the following water/oil repellent compositions have, for example, been proposed:

(1) a water/oil repellent composition containing a copolymer, as an indispensable component, which consists essentially of polymerized units derived from following monomer (a) and following monomer (b) (Patent Document 1):

monomer (a): a monomer having a $C_{1-6}$ perfluoroalkyl group (hereinafter referred to as a $R^F$ group), etc.;

monomer (b): a (meth)acrylate having an alkyl group having at least 15 carbon atoms, etc.;

(2) a water/oil repellent composition containing a copolymer, as an indispensable component, which contains polymerized units derived from following monomer (a) and monomer (b) in an amount of at least 30 mass % and less than 80 mass % and further contains polymerized units derived from monomer (c) (Patent Document 2):

monomer (a): a monomer having a $C_{1-6}$ $R^F$ group, etc.;

monomer (b): a monomer having no $R^f$ group and having a cross-linkable functional group;

monomer (c): at least one monomer having no $R^f$ group (excluding monomer (b)), which contains the following monomer (c1) or (c2) in an amount of at least 50 mass % based on the total amount of monomer (c):

monomer (c1): a (meth)acrylate having a $C_{16-40}$ alkyl group, etc.; and monomer (c2): a monomer, of which the glass transition point of the homopolymer is from −50° C. to 40° C. (excluding monomer (c1)).

However, the water/oil repellent compositions (1) and (2) have a problem such that their water/oil repellency is likely to deteriorate when they are exposed to heavy rain. Therefore, a water/oil repellent composition is desired, of which the water/oil repellency does not substantially deteriorate even when it is exposed to heavy rain, i.e. a water/oil repellent composition with heavy-rain durability is desired.

Patent Document 1: WO02/083809
Patent Document 2: WO2004/035708

DISCLOSURE OF THE INVENTION

Object to be Accomplished by the Invention

The present invention is to provide a method for producing a water/oil repellent composition which can impart water/oil repellency to a surface of an article and has excellent durability (wash durability and heavy-rain durability), and an article which has water/oil repellency and is less susceptible to deterioration of the water/oil repellency by washing or heavy rain.

Means to Accomplish the Object

The method for producing a water/oil repellent composition of the present invention is characterized in that it comprises polymerizing a monomer component comprising the following monomer (a) in coexistence with the following compound (x) in a medium in the presence of a surfactant and a polymerization initiator:

monomer (a): a compound of following formula (1):

$$(Z—Y)_nX \quad (1)$$

wherein Z is a $C_{1-20}$ $R^f$ group or a group of the following formula (2), Y is a bivalent organic group or a single bond, n is 1 or 2, and X is one of groups of the following formulae (3-1) to (3-5) when n is 1, or one of groups of the following formulae (4-1) to (4-4) when n is 2:

$$C_iF_{2i+1}O(CFX^1CF_2O)_jCFX^2— \quad (2)$$

wherein i is an integer of from 1 to 6, j is an integer of from 0 to 10, and each of $X^1$ and $X^2$ which are independent of each other, is a fluorine atom or a trifluoromethyl group;

$$—CR=CH_2 \quad (3\text{-}1)$$

$$—C(O)OCR=CH_2 \quad (3\text{-}2)$$

$$—OC(O)CR=CH_2 \quad (3\text{-}3)$$

$$—OCH_2\text{-}\phi\text{-}CR=CH_2 \quad (3\text{-}4)$$

$$—OCH=CH_2 \quad (3\text{-}5)$$

wherein R is a hydrogen atom, a methyl group or a halogen atom and $\phi$ is a phenylene group;

$$—CH[—(CH_2)_mCR=CH_2]— \quad (4\text{-}1)$$

$$—CH[—(CH_2)_mC(O)OCR=CH_2]— \quad (4\text{-}2)$$

$$—CH[—(CH_2)_mOC(O)CR=CH_2]— \quad (4\text{-}3)$$

$$—OC(O)CH=CHC(O)O— \quad (4\text{-}4)$$

wherein R is a hydrogen atom, a methyl group or a halogen atom, and m is an integer of from 0 to 4;

compound (x): a compound having at least two groups of the following formula (5):

$$—(CH_2)_a—CHR^1—(CH_2)_b—SH \quad (5)$$

wherein $R^1$ is a methyl group or an ethyl group, a is an integer of from 0 to 2, and b is 0 or 1.

The above Z is preferably an $R^f$ group having from 1 to 6 carbon atoms.

The above surfactant preferably comprises a nonionic surfactant and a cationic surfactant.

The above polymerization initiator is preferably a radical polymerization initiator.

The above monomer component preferably further contains the following monomer (b):

monomer (b): a monomer having no $R^f$ group and having a hydrocarbon group having at least 14 carbon atoms.

The above monomer component preferably further contains the following monomer (c):

monomer (c): at least one monomer selected from the group consisting of vinyl halide, vinylidene halide and a monomer of the following formula (6):

$$CH_2=CR^2—OC(O)R^3 \quad (6)$$

wherein $R^2$ is a hydrogen atom or a methyl group, and $R^3$ is a $C_{1-8}$ alkyl group.

The above monomer component preferably further contains the following monomer (d):

monomer (d): a monomer having no $R^f$ group and having a crosslinkable functional group.

The proportions of the respective monomers are preferably such that the monomer (a) is from 10 to 100 mass %, the monomer (b) is from 0 to 90 mass %, the monomer (c) is from 0 to 40 mass %, and the monomer (d) is from 0 to 20 mass %, in the monomer component (100 mass %).

The amount of the compound (x) is preferably from 0.1 to 10 parts by mass, the amount of the surfactant is preferably from 1 to 6 parts by mass, and the amount of the polymerization initiator is preferably from 0.1 to 1.0 parts by mass, per 100 parts by mass of the monomer component.

The article of the present invention is an article treated with the water/oil repellent composition produced by the method of the present invention.

EFFECTS OF THE INVENTION

By the method of this invention for producing a water/oil repellent composition, it is possible to produce a water/oil repellent composition which can impart water/oil repellency to a surface of an article and has excellent durability (wash durability and heavy-rain durability).

The article of this invention has water/oil repellency and is less susceptible to deterioration of the water/oil repellency by washing or heavy rain.

BEST MODE FOR CARRYING OUT THE INVENTION

In this specification, a compound represented by the formula (1) is referred to as compound (1). The same applies to compounds represented by other formulae. And, in this specification, a group represented by the formula (2) is referred to as group (2). The same applies to groups represented by in other formulae. And, a (meth)acrylate in this specification means an acrylate or a methacrylate. And, a monomer in this specification means a compound having a polymerizable unsaturated group. In addition, in this specification, an $R^f$ group is an alkyl group having all or some of its hydrogen atoms substituted by fluorine atoms, and an $R^F$ group is an alkyl group having all of its hydrogen atoms substituted by fluorine atoms.

<Method for Producing Water/Oil Repellent Composition>

The method for producing a water/oil repellent composition of the present invention comprises polymerizing a monomer component in coexistence with compound (x) in a medium in the presence of a surfactant and a polymerization initiator to obtain a dispersion of a (co)polymer.

The (co)polymer of the present invention means a polymer of one type or two types of monomers.

The polymerization method may, for example, be dispersion polymerization, emulsion polymerization, or suspension polymerization.

The method for producing the water/oil repellent composition of the present invention is preferably a method which comprises emulsion polymerizing a monomer component in coexistence with compound (x) in an aqueous medium in the presence of a surfactant and a polymerization initiator to obtain an emulsion of a (co)polymer.

From the viewpoint of yield improvement of the (co)polymer, it is preferable to pre-emulsify a mixture containing a monomer component, composition (x), a surfactant, and an aqueous medium before emulsion polymerization. For example, a mixture containing a monomer component, compound (x), a surfactant and an aqueous medium are mixed and dispersed by a homomixer or a high-pressure emulsification equipment.

(Monomer Component)

The monomer component contains monomer (a) as an indispensable component, and also contains monomers (b) to (e) as necessary.

Monomer (a):

Monomer (a) is compound (1):

$$(Z-Y)_n X \tag{1}$$

wherein Z represents a $C_{1-20}$ $R^f$ group or group (2):

$$C_i F_{2i+1} O(CFX^1 CF_2 O)_j CFX^2— \tag{2}$$

wherein i is an integer of from 1 to 6, j is an integer of from 0 to 10, and each of $X^1$ and $X^2$ which are independent of each other, is a fluorine atom or a trifluoromethyl group.

The $R^f$ group is preferably a $C_{1-6}$ $R^F$ group, more preferably a $C_{4-6}$ $R^F$ group. The $R^F$ group may have a straight chain structure or branched structure, preferably a straight chain structure.

The following groups may be mentioned as examples of Z:
$F(CF_2)_4—$,
$F(CF_2)_5—$,
$F(CF_2)_6—$,
$(CF_3)_2 CF(CF_2)_2—$,
$C_k F_{2k+1} O[CF(CF_3)CF_2 O]_h—CF(CF_3)—$, etc.:

wherein k is an integer of from 1 to 6, and h is an integer of from 0 to 10.

Y is a bivalent organic group or a single bond.

The bivalent organic group is preferably an alkylene group. The alkylene group may have a straight chain structure or branched structure. The alkylene group may have —O—, —NH—, —CO—, —SO$_2$—, —CD$^1$=CD$^2$- (wherein each of $D^1$ and $D^2$ which are independent of each other, is a hydrogen atom or a methyl group), etc.

The following groups may be mentioned as examples of Y:
—CH$_2$—,
—CH$_2$CH$_2$—,
—(CH$_2$)$_3$—,
—CH$_2$CH$_2$CH(CH$_3$)—,
—CH=CH—CH$_2$—, etc.

n is 1 or 2.

X is one of groups (3-1) to (3-5) when n is 1, and one of groups (4-1) to (4-4) when n is 2;

$$—CR=CH_2 \tag{3-1}$$

$$—C(O)OCR=CH_2 \tag{3-2}$$

$$—OC(O)CR=CH_2 \tag{3-3}$$

$$—OCH_2\text{-}\phi\text{-}CR=CH_2 \tag{3-4}$$

$$—OCH=CH_2 \tag{3-5}$$

where R is a hydrogen atom, a methyl group or a halogen atom and $\phi$ is a phenylene group;

$$—CH[—(CH_2)_m—CR=CH_2]— \tag{4-1}$$

$$—CH[—(CH_2)_m—C(O)OCR=CH_2]— \tag{4-2}$$

$$—CH[—(CH_2)_m—OC(O)CR=CH_2]— \tag{4-3}$$

$$—OC(O)CH=CHC(O)O— \tag{4-4}$$

where R is a hydrogen atom, a methyl group or a halogen atom and m is an integer of from 0 to 4.

From a viewpoint of the polymerizability with other monomers, flexibility of a film of the (co)polymer, adherence property of the (co)polymer to an article, solubility in a medium, ease of emulsion polymerization, etc., compound (1) is preferably a (meth)acrylate having a $C_{1-6}$ $R^F$ group, further preferably a methacrylate having a $C_{1-6}$ $R^F$ group, particularly preferably a methacrylate having a $C_{4-6}$ $R^F$ group.

Monomer (b):

Monomer (b) is a monomer which has no $R^f$ group and has a hydrocarbon group having at least 14 carbon atoms. When the hydrocarbon group has at least 14 carbon atoms, a water/oil repellent composition has excellent heavy-rain durability and wash durability.

Monomer (b) may, for example, be a (meth)acrylate, a vinyl ether, or a vinyl ester.

Monomer (b) is preferably a monomer having a $C_{16-40}$ saturated hydrocarbon group, more preferably a (meth)acrylate having a $C_{16-40}$ alkyl group, particularly preferably stearyl(meth)acrylate or behenyl(meth)acrylate.

Monomer (c):

Monomer (c) is a monomer selected from the group consisting of a vinyl halide, a vinylidene halide and a monomer of the following formula (6):

$$CH_2=CR^2-OC(O)R^3 \qquad (6)$$

wherein $R^2$ is a hydrogen atom or a methyl group, and $R^3$ is a $C_{1-8}$ alkyl group.

When a copolymer has polymerized units derived from monomer (c), the water/oil repellent composition is improved in adhesion to a material, whereby it has better wash durability as well as better heavy-rain durability.

Monomer (c) may, for example, be vinyl acetate, vinyl propionate, vinyl chloride, vinyl fluoride, vinylidene chloride or vinylidene fluoride, and is preferably vinyl acetate, vinyl chloride or vinylidene chloride.

Monomer (d):

Monomer (d) is a monomer having no $R^f$ group and having a crosslinkable functional group.

When the copolymer has polymerized units based on monomer (d), the durability (washing durability and heavy-rain durability) of the water/oil repellent composition will be further improved.

The crosslinkable functional group is preferably a functional group having at least one of a covalent bond, an ionic bond and a hydrogen bond, or a functional group which is capable of forming a crosslinked structure by interaction between such bonds.

The followings are preferred examples of such functional groups: an isocyanate group, a blocked isocyanate group, an alkoxysilyl group, an amino group, an alkoxymethylamide group, a silanol group, an ammonium group, an amide group, an epoxy group, a hydroxy group, an oxazoline group, a carboxy group, an alkenyl group, and a sulfonic acid group. An epoxy group, a blocked isocyanate group, a hydroxy group, an alkoxysilyl group, an amino group, or a carboxy group is particularly preferred.

Monomer (d) is preferably a (meta)acrylate, an acrylamide, a vinyl ether or a vinyl ester.

The following compounds may be mentioned as examples of monomer (d):

2-isocyanatoethyl(meth)acrylate, 3-isocyanatopropyl (meth)acrylate, 4-isocyanatobutyl(meth)acrylate, a 2-butanone oxime adduct of 2-isocyanatoethyl(meth)acrylate, a pyrazole adduct of 2-isocyanatoethyl(meth)acrylate, a 3,5-dimethylpyrazole adduct of 2-isocyanatoethyl(meth)acrylate, a 3-methylpyrazole adduct of 2-isocyanatoethyl(meth) acrylate, an ε-caprolactam adduct of 2-isocyanatoethyl (meth)acrylate, a 2-butanone oxime adduct of 3-isocyanatopropyl(meth)acrylate, and a pyrazole adduct of 3-isocyanatopropyl(meth)acrylate;

a 3,5-dimethylpyrazole adduct of 3-isocyanatopropyl (meth)acrylate, a 3-methylpyrazole adduct of 3-isocyanatopropyl(meth)acrylate, an ε-caprolactam adduct of 3-isocyanatopropyl(meth)acrylate, a 2-butanone oxime adduct of 4-isocyanatobutyl(meth)acrylate, a pyrazole adduct of 4-isocyanatobutyl(meth)acrylate, a 3,5-dimethylpyrazole adduct of 4-isocyanatobutyl(meth)acrylate, a 3-methylpyrazole adduct of 4-isocyanatobutyl(meth)acrylate, an ε-caprolactam adduct of 4-isocyanatobutyl(meth)acrylate, and a block body of methylethylketoxime of an isophorone diisocyanate adduct of 2-hydroxy methacrylate;

Methoxymethyl(meth)acrylamide, ethoxymethyl(meth) acrylamide, butoxymethyl(meth)acrylamide, diacetone acrylamide, γ-methacryloyloxypropyltrimethoxysilane, trimethoxyvinylsilane, vinyltrimethoxysilane, dimethylaminoethyl(meth)acrylate, diethylaminoethyl (meth)acrylate, dimethylaminopropyl(meth)acrylate, (meth) acryloylmorpholine, (meth)acryloyloxyethyltrimethylammonium chloride, (meth)acryloyloxypropyltrimethylammonium chloride, (meth)acrylamideethyltrimethylammonium chloride, and (meth)acrylamidepropyltrimethylammonium chloride;

t-butyl(meth)acrylamide sulfonic acid, (meth)acrylamide, N-methyl(meth)acrylamide, N-methylol(meth)acrylamide, N-butoxymethyl(meth)acrylamide, diacetone(meth)acrylamide, glycidyl(meth)acrylate, 2-hydroxyethyl(meth)acrylate, 2-hydroxypropyl(meth)acrylate, 4-hydroxybutyl(meth) acrylate, 3-chloro-2-hydroxypropyl methacrylate, a polyoxyalkylene glycol mono(meth)acrylate, (meth)acrylic acid, 2-(meth)acryloylxyethylsuccinic acid, 2-(meth)acryloylxyhexahydrophthalic acid, 2-(meth)acryloyloxyethyl acid phosphate, allyl(meth)acrylate, 2-vinyl-2-oxazoline, 2-vinyl-4-methyl-(2-vinyloxazoline), a polycaprolactone ester of hydroxyethyl(meth)acrylate, triallyl cyanurate, and triallyl isocyanurate; and a monofunctional polyoxyalkylene(meth)acrylate (the oxyalkylene group is one type or a combination of two types selected from the group consisting of an oxyethylene group, an oxypropylene group, an oxybutylene group and an oxytetramethylene group, and it may be a block copolymer or a random copolymer); a difunctional polyoxyethylene di(meth)acrylate (the oxyalkylene group is one type or a combination of two types selected from the group consisting of an oxyethylene group, an oxypropylene group, an oxybutylene group and an oxytetramethylene group, and it may be a block copolymer or a random copolymer); and ethylene glycol di(meth)acrylate.

Monomer (e):

Monomer (e) is a monomer other than monomer (a), monomer (b), monomer (c), and monomer (d).

The following compounds may be mentioned as examples of monomer (e):

Methyl acrylate, ethyl acrylate, propyl acrylate, butyl methacrylate, cyclohexyl acrylate, 2-ethylhexyl(meth)acrylate, butyl methacrylate, n-hexyl(meth)acrylate, butene, isoprene, butadiene, ethylene, propylene, vinyl ethylene, pentene, ethyl-2-propylene, butylethylene, cyclohexylpropylethylene, decylethylene, dodecylethylene, hexene, isohexylethylene, neopentylethylene, (1,2-diethoxycarbonyl)ethylene, (1,2-dipropoxycarbonyl)ethylene, methoxyethylene, ethoxyethylene, butoxyethylene, 2-methoxypropylene, pentyloxyethylene, cyclopentanoyloxyethylene, cyclopentylacetoxyethylene, styrene, α-methylstyrene, p-methylstyrene, hexylstyrene, octylstyrene, nonylstyrene, and chloroprene;

N,N,-dimethyl(meth)acrylamide, a vinylalkyl ether, an alkyl halide vinyl ether, a vinylalkyl ketone, butyl acrylate, propyl methacrylate, benzyl(meth)acrylate, octyl(meth)acrylate, decyl methacrylate, dodecyl acrylate, cyclododecyl acrylate, lauryl(meth)acrylate, 3-ethoxypropyl acrylate, methoxy-butyl acrylate, 2-ethylbutyl acrylate, 1,3-dimethylbutyl acrylate, 2-methylpentyl acrylate, aziridinylethyl (meth)acrylate, and 2-ethylhexylpolyoxyalkylene(meth)acrylate; and an alkyl crotonate, an alkyl maleate, an alkyl fumarate, an alkyl citraconate, an alkyl mesaconate, maleic anhydride, allyl acetate, N-vinylcarbazole, maleimide, N-methylmaleimide, a (meth)acrylate having a silicone in its side chain, a (meth)acrylate having an urethane bond, a (meth)acrylate having a polyoxy alkylene chain with a terminal $C_{1-4}$ alkyl group, an alkylene di(meth)acrylate, etc.

(Compound (x))

Compound (x) is a compound having at least two groups (5).

$$—(CH_2)_a—CHR^1—(CH_2)_b—SH \quad (5)$$

wherein $R^1$ is a methyl group or an ethyl group, a is an integer of from 0 to 2, and b is 0 or 1.

The monomer component is polymerized in coexistence with compound (x), whereby the water/oil repellent composition has excellent heavy-rain durability.

Compound (x) is preferably an ester of a multifunctional alcohol with compound (5-1), or a compound having a triazine ring.

$$HO—C(O)—(CH_2)_a—CHR^1—(CH_2)_b—SH \quad (5\text{-}1)$$

The multifunctional alcohol may, for example, be a $C_{2-10}$ alkylene glycol, diethylene glycol, glycerin, dipropylene glycol, trimethylolpropane, pentaerythritol, or dipentaerythritol.

The following compounds may be mentioned as examples of compound (x):

Ethylene glycol bis(3-mercapto butyrate), diethylene glycol bis(3-mercapto butyrate), butanediol bis(3-mercapto butyrate), trimethylolpropane tris(3-mercapto butyrate), pentaerythritol tetrakis(3-mercapto butyrate), dipentaerythritol hexakis(3-mercapto butyrate), ethylene glycol bis(3-mercapto isobutyrate), diethylene glycol bis(3-mercapto isobutyrate), butanediol bis(3-mercapto isobutyrate), trimethylolpropane tris(3-mercapto isobutyrate), pentaerythritol hexakis (3-mercapto isobutyrate), octanediol bis(3-mercapto isobutyrate), octanediol bis(3-mercapto butyrate), octanediol bis(3-mercapto isobutyrate), 2,4,6-trimercapto triazine, 1,3,5-tris(3-mercapto butyloxyethyl)-1,3,5-triazine-2,4,6(1H,3H,5H)-trione, and 1,3,5-tris(3-mercapto isobutyloxyethyl)-1,3,5-triazine-2,4,6(1H,3H,5H)-trione.

Compound (x) is preferably diethylene glycol bis(3-mercapto butyrate), pentaerythritol tetrakis(3-mercapto butyrate), 2,4,6-trimercapto triazine, or 1,3,5-tris(3-mercapto butyloxyethyl)-1,3,5-triazine-2,4,6(1H,3H,5H)-trione.

(Surfactant)

The surfactant may be a hydrocarbon surfactant or a fluorinated surfactant, and, each of them includes an anionic surfactant, an nonionic surfactant, a cationic surfactant and a zwitterionic surfactant.

From the viewpoint of dispersing stability, the surfactant is preferably a combination of a nonionic surfactant and a cationic surfactant, or an anionic surfactant alone, more preferably a combination of a nonionic surfactant and a cationic surfactant.

The ratio of a nonionic surfactant to a cationic surfactant (a nonionic surfactant/a cationic surfactant) is preferably from 97/3 to 40/60 (mass ratio), more preferably from 95/5 to 50/50.

In a specific combination of a nonionic surfactant and an cationic surfactant, their total amount in the (co)polymer (100 mass %) can be adjusted to be at most 5 mass %, whereby hydrophilicity of the water/oil repellent composition is reduced to give excellent water repellency to an article.

The nonionic surfactant is preferably at least one member selected from the group of surfactants $s^1$, $s^2$, $s^3$, $s^4$, $s^5$ and $s^6$.

Surfactant $s^1$:

Surfactant $s^1$ may, for example, be a polyoxyalkylene monoalkyl ether, a polyoxyalkylene monoalkenyl ether, a polyoxyalkylene monoalkapolyenyl ether or a polyoxyalkylene monopolyfluoroalkyl ether.

Surfactant $s^1$ is preferably a polyoxyalkylene monoalkyl ether, a polyoxyalkylene monoalkenyl ether or a polyoxyalkylene monopolyfluoroalkyl ether. As $s^1$, one of such surfactants may be used alone, or two or more of them may be used in combination.

An alkyl group, an alkenyl group, an alkapolyenyl group or a polyfluoroalkyl group (hereinafter collectively referred to as an $R^S$ group) preferably has from 4 to 26 carbon atoms. The $R^S$ group may have a straight chain structure or a branched structure. The branched-structured $R^S$ group is preferably a secondary alkyl group, a secondary alkenyl group or a secondary alkapolyenyl group. A part or all of the hydrogen atoms of the $R^S$ group may be substituted by fluorine atoms.

Specific examples of the $R^S$ group include an octyl group, an dodecyl group, a tetradecyl group, a hexadecyl group, a stearyl group (octadecyl group), a behenyl group (docosyl group), an oleyl group (9-octadecenyl group), a heptadecylfluorooctyl group, a tridecylfluorohexyle group, 1H,1H,2H,2H-tridecylfluorooctyl group, and a 1H,1H,2H,2H-nonafluorohexyl group.

A polyoxyalkylene (hereinafter referred to as POA) chain is preferably a catenated chain consisting of two or more of polyoxyethylene (hereinafter referred to as POE) chains and/or polyoxypropylene (hereinafter referred to as POP) chains. The POA chain may consists of one type of POA chains or two or more types of POA chains. When the POA chain consists of two or more types of POA chains, such POA chains are preferably linked to form blocks.

Surfactant $s^1$ is more preferably compound ($s^{11}$):

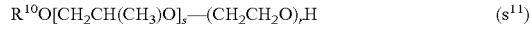
$$R^{10}O[CH_2CH(CH_3)O]_s—(CH_2CH_2O)_rH \quad (s^{11})$$

wherein $R^{10}$ is an alkyl group having at least 8 carbon atoms or an alkenyl group having at least 8 carbon atoms, r is an integer of from 5 to 50, and s is an integer of from 0 to 20. Some of the hydrogen atoms of the $R^{10}$ may be substituted by fluorine atoms.

When r is at least 5, the surfactant is soluble in water and homogeneously soluble in an aqueous medium, thus the water/oil repellent composition has good penetrating properties to an article. When r is at most 50, its hydrophilicity is suppressed and water repellency will be good.

When s is at most 20, the surfactant is soluble in water and homogeneously soluble in an aqueous medium, thus the water/oil repellent composition has good penetrating properties to an article.

When r and s are at least 2, the POE chains and the POP chains are linked to form blocks.

$R^{10}$ is preferably a straight chain or a branched chain.

r is preferably an integer of from 10 to 30.

s is preferably an integer of from 0 to 10.

The followings compounds may be mentioned as examples of compound ($s^{11}$), wherein the POE chains and the POP chains are linked in block form:

$C_{18}H_{37}O[CH_2CH(CH_3)O]_2$—$(CH_2CH_2O)_{30}H$,
$C_{18}H_{35}O$—$(CH_2CH_2O)_{30}H$,
$C_{16}H_{33}O[CH_2CH(CH_3)O]_5$—$(CH_2CH_2O)_{20}H$,
$C_{12}H_{25}O[CH_2CH(CH_3)O]_2$—$(CH_2CH_2O)_{15}H$,
$(C_8H_{17})(C_6H_{13})CHO$—$(CH_2CH_2O)_{15}H$,
$C_{10}H_{21}O[CH_2CH(CH_3)O]_2$—$(CH_2CH_2O)_{15}H$,
$C_6F_{13}CH_2CH_2O$—$(CH_2CH_2O)_{15}H$,
$C_6F_{13}CH_2CH_2O[CH_2CH(CH_3)O]_2$—$(CH_2CH_2O)_{15}H$, and
$C_4F_9CH_2CH_2O[CH_2CH(CH_3)O]_2$—$(CH_2CH_2O)_{15}H$.

Surfactant $s^2$:

Surfactant $s^2$ is a nonionic surfactant made of a compound having at least one carbon-carbon triple bond and at least one hydroxy group in its molecule.

Surfactant $s^2$ is preferably a nonionic surfactant made of a compound having one carbon-carbon triple bond and one or two hydroxy group(s) in its molecule.

Surfactant $s^2$ may have a POA chain in the molecule. The POA chain may, for example, be a POE chain, a POP chain, a chain wherein POE chains and POP chains are linked in a random manner, or a chain wherein POE chains and POP chains are linked in block form.

Surfactant $s^2$ is preferably compounds ($s^{21}$) to ($s^{24}$):

$$HO-CR^{11}R^{12}-C\equiv C-CR^{13}R^{14}-OH \quad (s^{21})$$

$$HO-(A^1O)_u-CR^{11}R^{12}-C\equiv C-CR^{13}R^{14}-(OA^2)_v-OH \quad (s^{22})$$

$$HO-CR^{15}R^{16}-C\equiv C-H \quad (s^{23})$$

$$HO-(A^3O)_w-CR^{15}R^{16}-C\equiv C-H \quad (s^{24})$$

Each of $A^1$ to $A^3$ which are independent of one another, is an alkylene group.

Each of u and v is an integer of at least 0, and (u+v) is an integer of at least 1.

w is at least 1.

When each of u, v and w is at least 2, the plurality of each of $A^1$, $A^2$ and $A^3$ may be the same or different, respectively.

A POA chain is preferably a POE chain, a POP chain or a chain containing a POE chain and a POP chain. The number of repeating units of a POA chain is preferably 1 to 50.

Each of $R^{11}$ to $R^{16}$ which are independent of one another, is a hydrogen atom or an alkyl group.

The alkyl group is preferably a $C_{1-12}$ alkyl group, and more preferably a $C_{1-4}$ alkyl group. The alkyl group may, for example, be a methyl group, an ethyl group, a propyl group, a butyl group, or an isobutyl group.

Compound ($s^{22}$) is preferably compound ($s^{25}$);

$$(s^{25})$$
$$\begin{array}{c} (CH_3)_2CHCH_2 \quad CH_3 \\ | \quad\quad\quad | \\ HO(CH_2CH_2O)_xC-C\equiv C-C(OCH_2CH_2)_yOH \\ | \quad\quad\quad | \\ CH_3 \quad\quad CH_2CH(CH_3)_2 \end{array}$$

wherein each of x and y is an integer of from 0 to 100.

One of compound ($s^{25}$) may be used alone, or two or more of them may be used in combination.

Compound ($s^{25}$) is preferably a compound wherein both x and y are 0, sum of x and y is from 1 to 4, or the average of sum of x and y is from 10 to 30.

Surfactant $s^3$:

Surfactant $s^3$ is a nonionic surfactant made of a compound, wherein a POE chain and a POA chain consisting of consecutively-connected two or more oxyalkylene having at least 3 carbon atoms are catenated, and both two terminals are hydroxy groups.

A polyoxytetramethylene (hereinafter referred to as POT) and/or a POP chain is preferred as such a POA chain.

Surfactant $s^3$ is preferably compound ($s^{31}$) or compound ($s^{32}$):

$$HO(CH_2CH_2O)_{g1}(C_3H_6O)_t(CH_2CH_2O)_{g2}H \quad (s^{31})$$

$$HO(CH_2CH_2O)_{g1}(CH_2CH_2CH_2CH_2O)_t(CH_2CH_2O)_{g2}H \quad (s^{32})$$

g1 is an integer of from 0 to 200.
t is an integer of from 2 to 100.
g2 is an integer of from 0 to 200.

When g1 is 0, g2 is an integer of at least 2. When g2 is 0, g1 is an integer of at least 2.

—$C_3H_6$— may be —$CH(CH_3)CH_2$—, —$CH_2CH(CH_3)$—, or mixture of —$CH(CH_3)CH_2$— and —$CH_2CH(CH_3)$—.

The POA chains are in block form.

The following compounds may be mentioned as examples of surfactant $s^3$:

$HO$—$(CH_2CH_2O)_{15}$—$(C_3H_6O)_{35}$—$(CH_2CH_2O)_{15}H$,
$HO$—$(CH_2CH_2O)_8$—$(C_3H_6O)_{35}$—$(CH_2CH_2O)_8H$,
$HO$—$(CH_2CH_2O)_{45}$—$(C_3H_6O)_{17}$—$(CH_2CH_2O)_{45}H$, and
$HO$—$(CH_2CH_2O)_{34}$—$(CH_2CH_2CH_2CH_2O)_{28}$—$(CH_2CH_2O)_{34}H$.

Surfactant $s^4$:

Surfactant $s^4$ is a nonionic surfactant having an amine-oxide portion in the molecule.

Surfactant $s^4$ is preferably compound ($s^{41}$);

$$(R^{17})(R^{18})(R^{19})N(\rightarrow O) \quad (s^{41})$$

wherein each of $R^{17}$ to $R^{19}$ which are independent of one another, is a $C_{1-24}$ monovalent hydrocarbon group.

A surfactant having an amine oxide (N→O) is regarded as the nonionic surfactant in the present invention.

One of compound ($s^{41}$) may be used alone, or two or more of them may be used in combination.

Compound ($s^{41}$) is preferably compound ($s^{42}$) from the viewpoint of dispersion stability of the copolymer;

$$(R^{20})(CH_3)_2N(\rightarrow O) \quad (s^{42})$$

wherein $R^{20}$ is a $C_{6-22}$ alkyl group, a $C_{6-22}$ alkenyl group, a phenyl group combined with a $C_{6-22}$ alkyl group, a phenyl group combined with a $C_{6-22}$ alkenyl group, or a $C_{6-13}$ fluoroalkyl group. $R^{20}$ is preferably a $C_{8-22}$ alkyl group, a $C_{8-22}$ alkenyl group or a $C_{4-9}$ polyfluoroalkyl group.

The following compounds may be mentioned as examples of compound ($s^{42}$):

$[H(CH_2)_{12}](CH_3)_2N(\rightarrow O)$,
$[H(CH_2)_{14}](CH_3)_2N(\rightarrow O)$,
$[H(CH_2)_{16}](CH_3)_2N(\rightarrow O)$,
$[H(CH_2)_{18}](CH_3)_2N(\rightarrow O)$,
$[F(CF_2)_6(CH_2)_2](CH_3)_2N(\rightarrow O)$, and
$[F(CF_2)_4(CH_2)_2](CH_3)_2N(\rightarrow O)$.

Surfactant $s^5$:

Surfactant $s^5$ is a nonionic surfactant made of a polyoxyethylene mono(substituted phenyl)ether condensate or a polyoxyethylene mono(substituted phenyl)ether.

The substituted phenyl group is preferably a phenyl group substituted by a $C_{7-24}$ monovalent hydrocarbon group, and more preferably a phenyl group substituted by an alkyl group, an alkenyl group or a styryl group.

Surfactant $s^5$ is preferably a polyoxyethylene mono(alkylphenyl)ether condensate, a polyoxyethylene mono(alkenylphenyl)ether condensate, a polyoxyethylene mono(alkylphenyl)ether, a polyoxyethylene mono(alkenylphenyl)ether, or a polyoxyethylene mono[(alkyl)(styryl)phenyl]ether.

The polyoxyethylene mono(substituted phenyl)ether condensate or polyoxyethylene mono(substituted phenyl)ether may, for example, be a formaldehyde condensate of polyoxyethylene mono(nonylphenyl)ether, polyoxyethylene mono(nonylphenyl)ether, polyoxyethylene mono(octylphenyl)ether, polyoxyethylene mono(oleylpheyl)ether, polyoxyethylene [(nonyl)(styryl)phenyl]ether, or polyoxyethylene mono[(oleyl)(styryl)phenyl]ether.

Surfactant $s^6$:

Surfactant $s^6$ is a nonionic surfactant made of a fatty acid ester of a polyol.

The polyol represents glycerin, sorbitan, sorbit, polyglycerin, polyethylene glycol, polyoxyethylene glyceryl ether, polyoxyethylene sorbitan ether, polyoxyethylene sorbit ether, etc.

Surfactant $s^6$ may, for example, be an ester derived from stearic acid and polyethylene glycol in 1:1 molar ratio, an ester derived from an ether of sorbit and polyethylene glycol, and oleic acid in 1:4 molar ratio, an ester derived from an ether of polyoxyethylene glycol and sorbitan, and stearic acid in 1:1 molar ratio, an ester derived from an ether of polyethylene glycol and sorbitan, and oleic acid in 1:1 molar ratio, an ester derived from dodecanoic acid and sorbitan in 1:1 molar ratio, an ester derived from oleic acid and decaglycerin in 1:1 or 2:1 molar ratio, and an ester derived from stearic acid and decaglycerin in 1:1 or 2:1 molar ratio.

Surfactant $s^7$:

When the surfactant contains a cationic surfactant, surfactant $s^7$ is preferred as such a cationic surfactant.

Surfactant $s^7$ is a cationic surfactant of a substituted ammonium salt form.

Surfactant $s^7$ is preferably an ammonium salt, wherein at least one hydrogen atom connected to the nitrogen atom is substituted by an alkyl group, an alkenyl group or a POA chain having a hydroxy group at the terminal, and is more preferably compound ($s^{71}$);

$$[(R^{21})_4 N^+] \cdot X^- \quad (s^{71})$$

wherein $R^{21}$ is a hydrogen atom, a $C_{1-22}$ alkyl group, a $C_{2-22}$ alkenyl group, a $C_{1-9}$ fluoroalkyl group, or a POA chain having a hydroxy group at the terminal.

The four $R^{21}$ may be the same or different, however, all of the four $R^{21}$ are not hydrogen atoms at the same time.

$R^{21}$ is preferably a $C_{6-22}$ long-chain alkyl group, a $C_{6-22}$ long-chain alkenyl group, or a $C_{1-9}$ fluoroalkyl group.

When $R^{21}$ is an alkyl group other than a long-chain alkyl group, the $R^{21}$ is preferably a methyl group or an ethyl group.

When $R^{21}$ is a POA chain having a hydroxy group at the terminal, the POA chain is preferably a POE chain.

$X^-$ is a counter ion.

$X^-$ is preferably a chloride ion, an ethylsulfate ion or an acetate ion.

Compound ($s^{71}$) may, for example, be monostearyltrimethylammonium chloride, monostearyldimethylmonoethylammonium ethylsulfate, mono(stearyl)monomethyldi(polyethylene glycol)ammonium chloride, monofluorohexyltrimethylammonium chloride, di(tallow alkyl)dimethylammonium chloride, or dimethyl mono coconut amine acetate.

Surfactant $s^8$:

When the surfactant contains a zwitterionic surfactant, surfactant $s^8$ is preferred as such a surfactant.

Surfactant $s^8$ may, for example, be alanine, imidazolinium betaine, amidebetaine or betaine acetate.

The hydrophobic group in the surfactant $s^8$ is preferably a $C_{6-22}$ long-chain alkyl group, a $C_{6-22}$ long-chain alkenyl group, or a $C_{1-9}$ fluoroalkyl group.

Surfactant $s^8$ may, for example, be dodecylbetaine, stearylbetaine, dodecylcarboxymethylhydroxyethyl imidazolinium betaine, dodecydimethylaminoacetate betaine, or fatty acid amidepropyl dimethylaminoacetate betaine.

Surfactant $s^9$:

Surfactant $s^9$ may used as the surfactant.

Surfactant $s^9$ is a polymeric surfactant made of a block copolymer, a random copolymer or a hydrophobically modified body of a hydrophilic copolymer derived from a hydrophilic monomer and a hydrophobic hydrocarbon and/or a fluoro monomer.

Surfactant $s^9$ may, for example, be a block or random copolymer derived from polyethylene glycol(meth)acrylate and a long-chain alkyl acrylate, a block or random copolymer derived from polyethylene glycol(meth)acrylate and a fluoro (meth)acrylate, a block or random copolymer derived from vinyl acetate and a long-chain alkyl vinyl ether, a block or random copolymer derived from vinyl acetate and a long-chain alkylvinyl ester, a polymer derived from styrene and maleic anhydride, a condensate of polyvinyl alcohol and stearic acid, a condensate of polyvinyl alcohol and stearyl mercaptan, a condensate of polyallylamine and stearic acid, a condensate of polyethyleneimine and stearyl alcohol, methylcellulose, hydroxypropylmethylcellulose, or hydroxyethylmethylcellulose.

Examples of a commercial product of surfactant $s^9$ include MP Polymer (item code: MP-103, MP-203) manufactured by Kurary Co., Ltd., SMA resins manufactured by Elf Atochem Inc., METOLOSE manufactured by Shin-Etsu Chemical Co., Ltd., EPOMIN RP manufactured by NIPPON SHOKUBAI Co., Ltd., and Surflon (item code: S-381, S-393) manufactured by AGC Seimi Chemical Co., Ltd.

Surfactant $s^{91}$: is preferably surfactant $s^{91}$ when the solvent is organic, or the organic content in the solvent is high;

Surfactant $s^{91}$: a polymeric surfactant made of a block or random copolymer of a lipophilic monomer and a fluoromonomer.

Surfactant $s^{91}$ may, for example, be a copolymer derived from an alkyl acrylate and fluoro(meth)acrylate, or a copolymer derived from an alkylvinylether and a fluoroalkylvinylether.

Examples of a commercial product of surfactant $s^{91}$ include Surflon (item code: S-383, SC-100 series) manufactured by AGC Seimi Chemical Co., Ltd.

From the viewpoint of excellence in water repellency and durability of the water/oil repellent composition, combination of the surfactants is preferably a combination of surfactant $s^1$, surfactant $s^2$ and surfactant $s^7$; a combination of surfactant $s^1$, surfactant $s^3$ and surfactant $s^7$; or a combination of surfactant $s^1$, surfactant $s^2$, surfactant $s^3$ and surfactant $s^7$, more preferably such combinations wherein surfactant $s^7$ is compound ($s^{71}$).

(Medium)

The medium may, for example, be water, an alcohol, a glycol, a glycol ether, a halogen compound, a hydrocarbon, a ketone, an ester, an ether, a nitrogenous compound, a sulfur compound, an inorganic solvent, or an organic acid. Among them, at least one selected from the group consisting of water, an alcohol, a glycol, a glycol ether and a glycol ester is preferred from the viewpoint of solubility and ease in handling.

The alcohol may, for example, be methanol, ethanol, 1-propanol, 2-propanol, 1-butanol, 2-butanol, 2-methylpropanol, 1,1-dimethylethanol, 1-pentanol, 2-pentanol, 3-pentanol, 2-methyl-1-butanol, 3-methyl-1-butanol, 1,1-dimethylpropanol, 3-methyl-2-butanol, 1,2-dimethylpropanol, 1-hexanol, 2-methyl-1-pentanol, 4-methyl-2-pentanol, 2-ethyl-1-butanol, 1-heptanol, 2-heptanol, or 3-heptanol.

The glycol may, for example, be ethylene glycol, ethylene glycol monomethyl ether, ethylene glycol monoethyl ether, ethylene glycol monobutyl ether, ethylene glycol monomethyl ether acetate, ethylene glycol monoethyl ether acetate, ethylene glycol monobutyl ether acetate, or propylene glycol. The glycol ether may, for example, be propylene glycol monomethyl ether, propylene glycol monoethyl ether, propylene glycol dimethyl ether, dipropylene glycol, dipropylene glycol monomethyl ether, dipropylene glycol dimethyl ether, dipropylene glycol monoethyl ether, tripropylene glycol, tripropylene glycol monomethyl ether, polypropylene glycol, or hexylene glycol.

The halogen compound may, for example, be a halogenated hydrocarbon, or a halogenated ether.

The halogenated hydrocarbon may, for example, be a hydrochlorofluorocarbon, a hydrofluorocarbon, or a hydrobromocarbon.

The halogenated ether may, for example, be a hydrofluoro ether.

The hydrofluoro ether may, for example, be a separated-type hydrofluoro ether or a non-separated-type hydrofluoro ether. The separated-type hydrofluoro ether is a compound wherein an $R^F$ or perfluoroalkylene group, and an alkyl or alkylene group, are connected via an etheric oxygen atom. The non-separated-type hydrofluoro ether is a hydrofluoro ether having a partially fluorinated alkyl or alkylene group.

The hydrocarbon may, for example, be an aliphatic hydrocarbon, an alicyclic hydrocarbon, or an aromatic hydrocarbon.

The aliphatic hydrocarbon may, for example, be pentane, 2-methylbutane, 3-methylpentane, hexane, 2,2-dimethylbutane, 2,3-dimethylbutane, heptane, octane, 2,2,4-trimethylpentane, 2,2,3-trimethylhexane, decane, undecane, dodecane, 2,2,4,6,6-pentamethylheptane, tridecane, tetradecane, or hexadecane.

The alicyclic hydrocarbon may, for example, be cyclopentane, methylcyclopentane, cyclohexane, methylcyclohexane, or ethylcyclohexane.

The aromatic hydrocarbon may, for example, be benzene, toluene, or xylene.

The ketone may, for example, be acetone, methyl ethyl ketone, 2-pentanone, 3-pentanone, 2-hexanone, or methyl isobutyl ketone.

The ester may, for example, be methyl acetate, ethyl acetate, butyl acetate, methyl propionate, methyl lactate, ethyl lactate, or pentyl lactate.

The ether may, for example, be diisopropyl ether, dioxane, or tetrahydrofuran.

The nitrogenous compound may, for example, be pyridine, N,N-dimethylformaldehyde, N,N-dimethylacetamide, or N-methylpyrrolidone.

The sulfur compound may, for example, be dimethyl sulfoxide, or sulfolane.

The inorganic solvent may, for example, be liquid carbon dioxide.

The organic acid may, for example, be acetic acid, propionic acid, malic acid, or lactic acid.

One of such media may be used alone, or two or more of them may be used in combination as a mixture. When two or more of such media are used in combination as a mixture, one of them is preferably water. By using a mixture of media, control of solubility and dispersibility of the (co)polymer may be easy, and control of penetrating properties and wettability to an article and solvent drying speed at the time of manufacture may be easy.

(Polymerization Initiator)

The polymerization initiator may, for example, be a thermal polymerization initiator, an optical polymerization initiator, a radiation polymerization initiator, a radical polymerization initiator, or an ionic polymerization initiator, and is preferably a water-soluble or oil-soluble radical polymerization initiator.

Common polymerization initiators such as an azo polymerization initiator, a peroxide polymerization initiator, a redox polymerization initiator, etc. are used as a radical polymerization initiator depending on the polymerization temperature. The radical polymerization initiator is particularly preferably an azo polymerization initiator, and the azo polymerization initiator is further preferably a salt of an azo compound when polymerization is carried out in an aqueous medium. The polymerization temperature is preferably between 20° C. and 150° C.

A molecular weight modifier may be used in the polymerization of the monomer component. The molecular weight modifier is preferably an aromatic compound, a mercapto alcohol a mercaptan, etc., particularly preferably an alkylmercaptan. A specific example of the molecular weight modifier may be mercaptoethanol, n-octylmercaptan, n-dodecylmercaptan, t-dodecylmercaptan, stearylmercaptan, or α-methylstyrene dimer $(CH_2=C(Ph)CH_2C(CH_3)_2Ph$, wherein Ph is a phenyl group).

The proportion of monomer (a) is preferably from 10 to 100 mass %, more preferably from 10 to 80 mass %, in the monomer component (100 mass %) from the viewpoint of water/oil repellency and durability of the water/oil repellent composition.

The proportion of monomer (b) is preferably from 0 to 90 mass %, more preferably from 10 to 70 mass %, in the monomer component (100 mass %) from the viewpoint of water/oil repellency and durability of the water/oil repellent composition.

The proportion of monomer (c) is preferably from 0 to 40 mass %, more preferably from 5 to 30 mass %, in the monomer component (100 mass %) from the viewpoint of water/oil repellency and durability of the water/oil repellent composition.

The proportion of monomer (d) is preferably from 0 to 20 mass %, more preferably from 0 to 10 mass %, in the monomer component (100 mass %) from the viewpoint of water/oil repellency and durability of the water/oil repellent composition.

The proportion of monomer (e) is preferably from 0 to 20 mass %, more preferably from 0 to 10 mass %, in the monomer component (100 mass %) from the viewpoint of water/oil repellency and durability of the water/oil repellent composition.

The mass ratio of monomer (a) to monomer (b) (monomer (a)/monomer (b)) is preferably from 8/1 to 1/6, more preferably from 7/1 to 1/4.

The mass ratio of monomer (a) to monomer (c) (monomer (a)/monomer (c)) is preferably from 12/1 to 1/1, more preferably from 9/1 to 1/1.

The amount of compound (x) is preferably from 0.1 to 10 parts by mass, more preferably from 0.1 to 5 parts by mass, per 100 parts by mass of the monomer component.

The total amount of the surfactants is preferably from 1 to 6 parts by mass, more preferably from 1 to 5 parts by mass, per 100 parts by mass of the monomer component.

The amount of the polymerization initiator is preferably from 0.1 to 1.0 parts by mass, more preferably from 0.1 to 0.8 parts by mass, per 100 parts by mass of the monomer component.

(Water/Oil Repellent Composition)

The water/oil repellent composition produced by the method of the present invention may contain additives.

Additives may, for example, be a penetrant, an anti-foaming agent, a water absorbent, an anti-stat, an anti-crease agent, a softener, a film-forming aid, a water-soluble polymer (polyacrylamide, polyvinyl alcohol, etc.), a thermosetting agent (melamine resin, urethane resin, etc.), an epoxy curing agent (isophthalic acid hydrazide, adipic acid dihydrazide, sebacic acid dihydrazide, dodecanedioic acid dihydrazide, 1,6-hexamethylene bis(N,N-dimethylsemicarbazide, 1,1,1',1'-tetramethyl-4,4'-(methylene-di-p-phenylene)disemicarbazide, spiroglycol, etc.), a thermosetting catalyst, a cross-linking catalyst, a synthetic resin, a fiber stabilizer, etc.

And, the content in the water/oil repellent composition (the content when the solid content concentration is 20 mass %) of perfluorooctanoic acid (PFOA), perfluorooctane sulfonate (PFOS), their precursors and their analogs, environmental impact of which is pointed out, is reduced to under the detection limit of analysis value of LC-MS/MS (liquid chromatography-tandem mass spectrometry) in the method disclosed in Japanese Patent Application No. 2007-333564.

The water/oil repellent composition of the present invention may be used alone, or used with another water/oil repellent composition by mixture. For example, it is used with a fluorinated soil release agent which has much hydrophilic component and little water repellent property, whereby wash-durable water/oil repellent soil-release finishing is possible.

Regarding the water/oil repellent composition, the (co)polymer is preferably dispersed particles in the medium. The average particle size of the (co)polymer is preferably from 10 to 1,000 nm, more preferably from 10 to 300 nm, particularly preferably from 10 to 200 nm. When the average particle size is within such a range, a surfactant, a dispersant, etc. are not required in large amounts, water/oil repellency is good, dyed fabrics can be treated without color dulling, and the particles are stably-dispersed without precipitation in the medium. The average particle size of the (co)polymer is measured by a dynamic light scattering device, an electron microscope, etc.

The solid content concentration of the water/oil repellent composition is preferably from 25 to 40 mass % in the water/oil repellent composition (100 mass %) immediately after the production thereof.

The solid content concentration of the water/oil repellent composition is preferably from 0.2 to 5 mass % in the water/oil repellent composition (100 mass %) at the time of treating articles.

The solid content concentration of the water/oil repellent composition is calculated from the mass of the water/oil repellent composition before heating and the mass of it after drying in the convection-drying machine at the temperature of 120° C. for 4 hours.

Solid content concentration of water/oil repellent composition (mass %)=(mass of water/oil repellent composition after heating at 120° C. for 4 hours/mass of water/oil repellent composition before heating)×100

In the above described method for producing a water/oil repellent composition of the present invention, a monomer component containing monomer (a) is polymerized in coexistence with compound (x) in a medium in the presence of a surfactant and a polymerization initiator, whereby it is possible to produce a water/oil repellent composition which can impart water/oil repellency to a surface of an article and is excellent in durability (wash durability and heavy-rain durability). In particular, a water/oil repellent composition obtained by using compound (x) has more heavy-rain durability than a conventional water/oil repellent composition which is produced without compound (x).

It is considered that this is because compound (x) coexists with the water/oil repellent composition whereby adhesion between the water/oil repellent composition and a material is improved. Although it is not certain how compound (x) behaves, it is assumed that compound (x) has both effects of a chain transfer agent and a crosslinking agent.

<Article>

The article of the present invention is an article treated with the water/oil repellent composition produced by the method of the present invention.

Examples of the article treated with the water/oil repellent composition include fibers (natural fibers, synthetic fibers, blended fibers, etc.), various fiber products, nonwoven fabrics, resins, paper, leather, metal, stone, concrete, plaster, and glass.

An example of a method for treating the article is to coat or dip the article with the water/oil repellent composition by a publicly-known coating method and then to dry it.

Additionally, such an article may be finished to be antistatic, softening, antibacterial, deodorant or waterproof.

An example of water proofing may be to form a water proof membrane. The water proof membrane may, for example, be a porous membrane obtained from a urethane resin or an acryl resin, a nonporous membrane obtained from a urethane resin or an acryl resin, a polytetrafluoroethylene membrane or a moisture-permeable water proof membrane which is a combination of the above membranes, etc.

Fabric products treated with the water/oil repellant composition of the present invention have softened textile because of softness of the coating, and are given water/oil repellency of high quality. And, they have excellent adhesion on the surface, and are given water/oil repellency by curing at a low temperature. And, because deterioration of the performance by friction and washing is small, the initial performance at the treatment can be stably maintained.

Paper treated with the water/oil repellent composition of the present invention has excellent size property, water repellency and oil repellency even when dried under a low-temperature drying condition.

Moreover, when resins, glass or surface of metals is treated with the water/oil repellent composition of the present invention, a water/oil repellent coating film which has good adhesion to an article and good film-forming property is formed.

EXAMPLES

Now, the present invention will be described in detail with reference to Examples. It should be understood, however, that the present invention is by no means limited to these Examples.

Examples 1 to 6, 8, 9, and 11 to 14 are working examples of the present invention, and Examples 7 and 10 are comparative examples.

The evaluation methods for the properties in this Examples are as follows.

(Water Repellency)

Water repellency of a test cloth was measured in accordance with the spray test of JIS L1092-1992. Water repellency was evaluated in grades listed in Table 1. +(−) beside the grade means that the property is slightly better (worse).

TABLE 1

| Water repellency level | State of object |
|---|---|
| 100 | No moistening or water drops on the surface |
| 90 | Slight water drops on the surface |
| 80 | Separate partial moistening on the surface |
| 70 | Moistening on the half of the surface |
| 50 | Moistening over the entire surface |
| 0 | Completely wetted |

(Wash Durability)

The test cloth was washed repeatedly for 100 times in accordance with the water-wash method of Annex Table 103 in JIS L0217. Next, it was dried in a room at a room temperature of 25° C. under a humidity of 60% overnight, and then the water repellency was measured.

(Oil Repellency)

Oil repellency of the test cloth was measured in accordance with the test method of AATCC-TM118-1966. Oil repellency was evaluated with grades listed in Table 2. +(−) besides the grade means that the property is slightly better (worse).

TABLE 2

| Oil repellency No. | Test liquid | Surface tension mN/m (25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-hexadecane | 27.3 |
| 2 | Nujol 65 part/hexadecane 35 part | 29.6 |
| 1 | Nujol | 31.2 |
| 0 | Oil repellency less than that of No. 1 | — |

(Wash Durability)

The test cloth was washed repeatedly for 20 times in accordance with the water-wash method of Annex Table 103 in JIS L0217. Next, it was dried in a room at a room temperature of 25° C. under a humidity of 60% overnight, and then the water repellency was measured.

(Heavy-Rain Durability)

Heavy-rain durability of the test cloth was measured by a rainfall test under the condition that rainfall amount was 100 cc/min, rainfall temperature was 20° C., and testing time was 1 or 20 minutes, by the method described in JIS L1092(C) (Bundesmann Test). Water repellency was evaluated with 5 grades of from 1 to 5. A higher the grade is, the better the water repellency is. The cloth of grade 3 or more is regarded to have water repellency.

(Wash Durability)

The test cloth was washed repeatedly for five times in accordance with the water-wash method of Annex Table 103 in JIS L0217. After washed, the test cloth was heated and dried at 120° C. for 60 seconds through a pintenter, and then its heavy-rain durability was measured.

Abbreviations in the Examples, e.g. a monomer, are as follows:

ABBREVIATIONS

Monomer (a)

FMA: $C_6F_{13}C_2H_4OC(O)C(CH_3)\!=\!CH_2$,
Cl-FA: $C_4F_9C_2H_4OC(O)CCl\!=\!CH_2$,
FA: $C_mF_{2m+1}C_2H_4OC(O)CCl\!=\!CH_2$ (average of m is 9)

Monomer (b)

STA: Stearyl acrylate
VA: Behenyl acrylate

Monomer (c)

VCM: Vinyl chloride
VdCl: Vinylidene chloride

Monomer (d)

D-BI: Adduct of 3,5-dimethylpyrazole of 2-isocyanatoethyl methacrylate (the following formula (7))

(7)

$$H_2C\!=\!\underset{\underset{O}{\|}}{\underset{C}{\overset{CH_3}{|}}}\!-\!O\!-\!CH_2\!-\!CH_2\!-\!\underset{H}{N}\!-\!\underset{\underset{O}{\|}}{C}\!-\!N\overset{\diagup N\!=\!\overset{CH_3}{\diagdown}}{\underset{\diagdown\,\underset{H_3C}{}\diagup}{}}$$

PFM-3: Polycaprolactone ester of hydroxyethyl methacrylate (average moles of caprolactone added: 3.7 mols)

PP500: Polypropylene glycol monomethacrylate (moles of propylene oxide added: 9 mols)

AP400: Polypropylene glycol monoacrylate (moles of propylene oxide added: 6 mols)

30PPT-800: Polypropylene glycol-tetramethylene glycol monomethacrylate (moles of propylene oxide added: 4 mols; moles of tetramethylene oxide added: 8 mols)

NMAM: N-Methylolacrylamide

Molecular Weight Modifier:

DoSH: n-Dodecyl mercaptan

Compound (x):

B—SH: Butanediol bis(3-mercapto butyrate) (the following formula (8))

P—SH: Pentaerythritol tetrakis(3-mercapto butyrate) (the following formula (9))

N—SH: 1,3,5-tris(3-mercapto butyloxyethyl)-1,3,5-triazine-2,4,6(1H,3H,5H)-trione (the following formula (10))

(8)

-continued

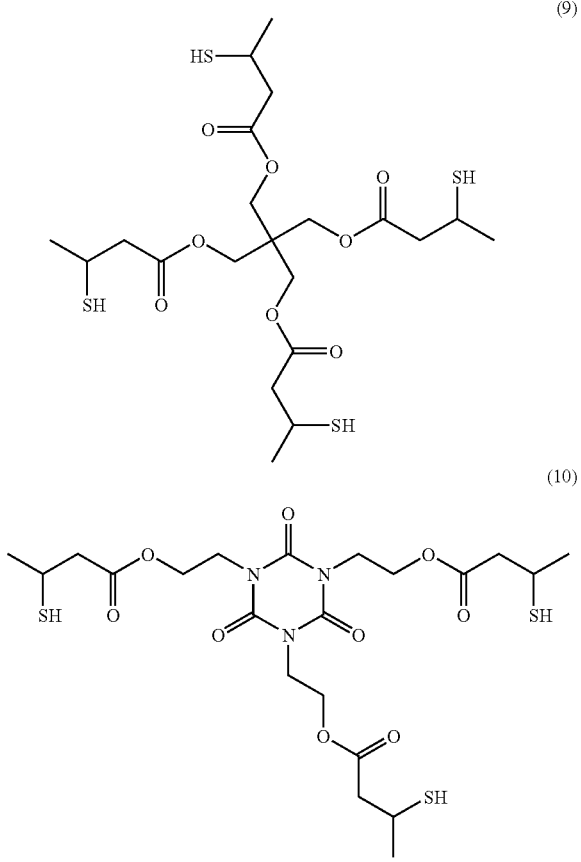

Surfactant s¹:
  PEO-20: Polyoxyethylene oleyl ether (about-20-mol ethylene oxide adduct)
  PEO-30: Ethylene oxide/propylene oxide polymer (proportion of ethylene oxide: 30 mass %)
Surfactant s³:
  PEPP-10: Polyoxyethylene/polyoxypropylene/polyoxyethylene block copolymer (molecular weight: 1,280; proportion of polyoxypropylene: 20 mass %)
  PEPP-33: Polyoxyethylene/polyoxypropylene/polyoxyethylene block copolymer (molecular weight: 3,300; proportion of polyoxypropylene: 40 mass %)
Surfactant s²:
  AEO-10: Ethylene oxide adduct of acetylene glycol (moles of ethylene oxide added: 10 mols)
  AEO-30: Ethylene oxide adduct of acetylene glycol (moles of ethylene oxide added: 30 mols)
Surfactant s⁷:
  STMAC: Monostearyltrimethylammonium chloride
  CMAC: Coco alkyltrimethylammonium chloride
Medium:
  Water: Ion-exchanged water
  DPG: Dipropylene glycol
Polymerization Initiator
  VA061-B: 10 mass % aqueous solution of acetate of 2,2'-azo-bis[2-(2-imidazolin-2-yl)propane] (manufactured by Wako Pure Chemical Industries, Ltd., VA061)

Example 1

89.3 g of FMA, 15.7 g STA, 4.8 g of D-BI, 0.85 g of B—SH, 3.02 g of PEO-20, 0.6 g of PEPP-33, 0.6 g of STMAC, 181.8 g of water and 36.2 g of DPG were put into a glass beaker, heated at 55° C. for 30 minutes, and then mixed by a homomixer (manufactured by NIHONSEIKI KAISHA Ltd., BIO MIXER) to obtain a mixed solution.

The mixed solution was treated by a high-pressure emulsification equipment (manufactured by APV Rannie, Mini-Lab) at 50° C. and 40 MPa to obtain an emulsion. 300 g of the obtained emulsion was put into a glass reactor, and was cooled to 30° C. or lower. 10.9 g of VdCl and 5.18 g of 10 mass % aqueous solution of VA061-B were added into the emulsion. Next, the gas phase was replaced with nitrogen. The reaction mixture was heated at 65° C. for 15 hours with stirring, and a copolymer emulsion of a solid content concentration of 36.0 mass % was obtained. Monomers, compound (x), types of surfactants and their charged amounts are shown in Table 3. The proportions of the monomers, the amount of compound (x) and the solid content concentration are shown in Table 4.

After the copolymer emulsion was diluted with tap water to adjust the solid content concentration to 1.0 mass %, trimethylol melamine resin (manufactured by Dainippon Ink and Chemicals, Inc., BECKAMINE M-3) as a thermosetting agent and an organic amine salt catalyst (manufactured by Dainippon Ink and Chemicals, Inc., BECKAMINE ACX) as a thermosetting catalyst were added so that each concentration would be 0.3 mass % in the water/oil repellent composition thereby to obtain a water/oil repellent composition.

A dyed nylon-cloth and a dyed polyester-cloth were dipped in the water/oil repellent composition, and the cloth were nipped to a wet pick-up of 35 mass % and 86 mass %, respectively. These cloth were dried at 110° C. for 90 seconds, and then at 170° C. for 60 seconds to obtain test cloth. Water repellency, oil repellency and heavy-rain durability of the test cloth were measured. The results are shown in Tables 5 and 6.

Examples 2 to 4

A copolymer emulsion was obtained in the same manner as Example 1 except that monomers, compound (x), types of surfactants and their charged amounts were changed to the types and the amounts shown in Table 3. The proportions of the monomers, the amount of compound (x) and the solid content concentration are shown in Table 4.

A water/oil repellent composition was obtained in the same manner as in Example 1 except for using such an emulsion.

Test cloth were obtained in the same manner as in Example 1 except for using such a water/oil repellent composition. Water repellency, oil repellency and heavy-rain durability of the cloth were measured. The results are shown in Tables 5 and 6.

Example 5

76.1 g of FA, 15.7 g of STA, 4.8 g of D-BI, 0.85 g of B—SH, 3.02 g of PEO-30, 0.6 g of CMAC, 0.6 g of PEPP-10, 181.8 g of water and 36.2 g of DPG were put into a glass beaker, heated at 55° C. for 30 minutes, and then mixed by a homomixer (manufactured by NIHONSEIKI KAISHA Ltd., BIO MIXER) to obtain a mixed solution.

The mixed solution was treated by a high-pressure emulsification equipment (manufactured by APV Rannie, Mini-Lab) at 50° C. and 40 MPa to obtain an emulsion. 300 g of the obtained emulsion was put into a stainless-steel reactor, and was cooled to 30° C. or lower. 5.18 g of 10 mass % aqueous solution of VA061-B were added into the emulsion. Next, the gas phase was replaced with nitrogen, and then, 24 g of VCM was introduced and polymerization was carried out at 65° C.

for 15 hours with stirring to obtain a copolymer emulsion which had a solid content concentration of 36.3 mass %. Monomers, compounds (x), types of surfactants and their charged amounts are shown in Table 3. The proportions of the monomers, the amount of compound (x) and the solid content concentration are shown in Table 4.

A water/oil repellent composition was obtained in the same manner as in Example 1 except for using such an emulsion.

Test cloth were obtained in the same manner as in Example 1 except for using such a water/oil repellent composition. Water repellency, oil repellency and heavy-rain durability of the cloth were measured. The results are shown in Tables 5 and 6.

Example 6

A copolymer emulsion was obtained in the same manner as Example 1 except that monomers, compound (x), types of surfactants and their charged amounts were changed to the types and the amounts shown in Table 3. The proportions of the monomers, the amount of compound (x) and the solid content concentration are shown in Table 4.

A water/oil repellent composition was obtained in the same manner as in Example 1 except for using such an emulsion.

Test cloth were obtained in the same manner as in Example 1 except for using such a water/oil repellent composition. Water repellency, oil repellency and heavy-rain durability of the cloth were measured. The results are shown in Tables 5 and 6.

Example 7

A copolymer emulsion was obtained in the same manner as Example 1 except that monomers, types of surfactants and their charged amounts were changed to the types and the amounts shown in Table 3 and that the amount of the molecular weight modifier shown in Table 3 was used instead of compound (x). The proportions of the monomers, the amount of compound (x) and the solid content concentration are shown in Table 4.

A water/oil repellent composition was obtained in the same manner as in Example 1 except for using such an emulsion.

Test cloth were obtained in the same manner as in Example 1 except for using such a water/oil repellent composition. Water repellency, oil repellency and heavy-rain durability of the cloth were measured. The results are shown in Tables 5 and 6.

Examples 8 and 9

A copolymer emulsion was obtained in the same manner as Example 5 except that monomers, compound (x), types of surfactants and their charged amounts were changed to the types and the amounts shown in Table 3. The proportions of the monomers, the amount of compound (x) and the solid content concentration are shown in Table 4.

Test cloth were obtained in the same manner as in Example 1 except for using such a water/oil repellent composition. Water repellency, oil repellency and heavy-rain durability of the cloth were measured. The results are shown in Tables 5 and 6.

Example 10

A copolymer emulsion was obtained in the same manner as Example 5 except that monomers, types of surfactants and their charged amounts were changed to the types and the amounts shown in Table 3 and that the amount of the molecular weight modifier shown in Table 3 was used instead of compound (x). The proportions of the monomers, the amount of compound (x) and the solid content concentration are shown in Table 4.

A water/oil repellent composition was obtained in the same manner as in Example 1 except for using such an emulsion.

Test cloth were obtained in the same manner as in Example 1 except for using such a water/oil repellent composition. Water repellency, oil repellency and heavy-rain durability of the cloth were measured. The results are shown in Tables 5 and 6.

Examples 11 to 14

A copolymer emulsion was obtained in the same manner as Example 5 except that monomers, compound (x), types of surfactants and their charged amounts were changed to the types and the amounts shown in Table 3. The proportions of the monomers, the amount of compound (x) and the solid content concentration are shown in Table 4.

Test cloth were obtained in the same manner as in Example 1 except for using such a water/oil repellent composition. Water repellency, oil repellency and heavy-rain durability of the cloth were measured. The results are shown in Tables 5 and 6.

Example 1-7

50 parts by mass of the copolymer emulsion obtained in Example 1 was mixed with 50 parts by mass of the copolymer emulsion obtained in Example 7 to obtain a copolymer emulsion in Example 13.

A water/oil repellent composition was obtained in the same manner as in Example 1 except for using such an emulsion.

The monomers, compound (x) and the types of surfactants and their amounts are shown in Table 3. The proportions of the monomers, the amount of compound (x) and the solid content concentration are shown in Table 4.

Test cloth were obtained in the same manner as in Example 1 except for using such a water/oil repellent composition. Water repellency, oil repellency and heavy-rain durability of the test cloth were measured. The results are shown in Tables 5 and 6.

TABLE 3

| | Example | | | | | | | | | | | | | |
|---|---|---|---|---|---|---|---|---|---|---|---|---|---|---|
| Charged amount | 1 | 2 | 3 | 4 | 5 | 6 | 7 | 8 | 9 | 10 | 11 | 12 | 13 | 14 |
| (a) FMA | 89.3 | 89.3 | 89.3 | | | 89.3 | 89.3 | 87.0 | 87.0 | 87.0 | 87.0 | 87.0 | 18.6 | 18.0 |
| (a) Cl-FA | | | | 89.3 | | | | | | | | | | |
| (a) FA | | | | | 76.1 | | | | | | | | | |
| (b) STA | 15.7 | 15.7 | | 15.7 | 15.7 | 15.7 | 15.7 | 14.5 | 14.5 | 14.5 | 14.5 | 14.5 | 72.7 | 72.1 |
| (b) VA | | | 15.7 | | | | | | | | | | | |

TABLE 3-continued

| | | Example | | | | | | | | | | | | | |
|---|---|---|---|---|---|---|---|---|---|---|---|---|---|---|---|
| Charged amount | | 1 | 2 | 3 | 4 | 5 | 6 | 7 | 8 | 9 | 10 | 11 | 12 | 13 | 14 |
| (c) | VCM | | | | | 24 | | 10.9 | 10.9 | 10.9 | 10.9 | 10.9 | 10.9 | 25.4 | 25.2 |
| (c) | VdCl | 10.9 | 10.9 | 10.9 | 10.9 | | 10.9 | | | | | | | | |
| (d) | D-BI | 4.8 | 4.8 | 4.8 | 4.8 | 4.8 | 4.8 | 4.8 | | 4.8 | 4.8 | 4.8 | 4.8 | | |
| (d) | PFM-3 | | | | | | | | 3.62 | | | | | | |
| (d) | PP500 | | | | | | | | | 3.62 | | | | | |
| (d) | AP400 | | | | | | | | | | 3.62 | | | | |
| (d) | 30PPT-800 | | | | | | | | | | | 3.62 | | | |
| (d) | HEMA | | | | | | | | | | | | | | 1 |
| (d) | NMAM | | | | | | | | | | | | 3.62 | 3.24 | 3.24 |
| | DoSH | | | | | | | 1.21 | | | 1.21 | | | | |
| (x) | B-SH | 0.85 | | | 0.85 | 0.85 | | | | 0.85 | | 0.85 | | | |
| (x) | P-SH | | 1.09 | | | | | | | | | | | | |
| (x) | N-SH | | | 0.79 | | | | 0.54 | | 0.54 | | | 0.54 | 0.54 | 0.54 |
| s¹ | PEO-20 | 3.02 | 3.02 | 3.02 | | | 3.02 | 3.02 | 3.02 | | | | 3.02 | 3.02 | 3.02 |
| s¹ | PEO-30 | | | | 3.02 | 3.02 | | | | 3.02 | 3.02 | | | | |
| s² | AEO-10 | | | | | | | | | | | 2.02 | | | |
| s² | AEO-30 | | | | | | | | | | | 1.0 | | | |
| s⁷ | STMAC | 0.6 | 0.6 | 0.6 | | | 0.6 | 0.6 | 0.6 | | | | 0.6 | 0.6 | 0.6 |
| s⁷ | CMAC | | | | 0.6 | 0.6 | | | | 0.6 | 0.6 | 0.6 | | | |
| s³ | PEPP-10 | | | 0.6 | 0.6 | | | | | 0.6 | 0.6 | 0.6 | | | |
| s³ | PEPP-33 | 0.6 | 0.6 | 0.6 | | | 0.6 | 0.6 | 0.6 | | | | 0.6 | 0.6 | 0.6 |

TABLE 4

| | | Example | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| Proportion (mass %) in monomer component (100 mass %) | | | | | | | | | | | | | | | |
| (a) | FMA | 74 | 74 | 74 | | | 74 | 74 | 72 | 72 | 72 | 72 | 72 | 15.5 | 15 |
| (a) | Cl-FA | | | | 74 | | | | | | | | | | |
| (a) | FA | | | | | 57.9 | | | | | | | | | |
| (b) | STA | 13 | 13 | | 13 | 11.9 | 13 | 13 | 12 | 12 | 12 | 12 | 12 | 60.6 | 60.1 |
| (b) | VA | | | 13 | | | | | | | | | | | |
| (c) | VCM | | | | | 18.3 | | 9 | 9 | 9 | 9 | 9 | 9 | 21.2 | 21.2 |
| (c) | VdCl | 9 | 9 | 9 | 9 | | 9 | | | | | | | | |
| (d) | D-BI | 4 | 4 | 4 | 4 | 3.7 | 4 | 4 | | 4 | 4 | 4 | 4 | | |
| (d) | PFM-3 | | | | | | | | 3 | | | | | | |
| (d) | PP500 | | | | | | | | | 3 | | | | | |
| (d) | AP400 | | | | | | | | | | 3 | | | | |
| (d) | 30PPT-800 | | | | | | | | | | | 3 | | | |
| (d) | HEMA | | | | | | | | | | | | | | 1 |
| (d) | NMAM | | | | | | | | | | | | 3 | 2.7 | 2.7 |
| Part by mass per 100 parts by mass of monomer component | | | | | | | | | | | | | | | |
| | DoSH | | | | | | | | 1 | | | 1 | | | |
| (x) | B-SH | 0.7 | | | 0.7 | 0.6 | | | | 0.7 | | 0.7 | | | |
| (x) | P-SH | | 0.9 | | | | | | | | | | | | |
| (x) | N-SH | | | 0.7 | | | | 0.4 | | 0.4 | | | 0.4 | 0.4 | 0.4 |
| | Solid content (mass %) | 36.0 | 36.2 | 36.2 | 36.2 | 36.3 | 36.3 | 36.3 | 36.3 | 36.3 | 36.3 | 36.3 | 36.5 | 34.2 | 34.2 |

TABLE 5

| | Base cloth Nylon | | | | | | |
|---|---|---|---|---|---|---|---|
| | Water repellency level | Oil repellency No. | Bundesmann test | | | | |
| Measure | | | Initial | | Post-washing | | |
| Frequency of washing | 0 | 0 | 0 | 0 | 5 | 5 | |
| | 100 | 20 | | | | | |
| Rainfall testing time (min.) | — | — | 1 | 20 | 1 | 20 | |
| Ex. 1 | 100 | 90 | 6− | 3 | 5 | 5 | 4.5 3.5 |
| Ex. 2 | 100 | 90 | 6− | 3 | 5 | 5 | 4.7 3.5 |
| Ex. 3 | 100 | 90+ | 6− | 3 | 5 | 5 | 4.5 3.5 |
| Ex. 4 | 100 | 100 | 6 | 3 | 5 | 5 | 4.5 4 |
| Ex. 5 | 100 | 100 | 6 | 4 | 5 | 5 | 4.5 4 |
| Ex. 6 | 100 | 90+ | 6− | 3 | 5 | 5 | 4.5 3 |
| Ex. 7 | 100 | 90 | 6− | 3− | 5 | 4.5 4 | 2.5 |
| Ex. 8 | 100 | 90 | 5 | 3− | 5 | 4 | 3.5 3 |

TABLE 5-continued

| | Base cloth Nylon | | | | | | | |
|---|---|---|---|---|---|---|---|---|
| | Water | Oil | Bundesmann test | | | | | |
| Measure | repellency level | | repellency No. | | Initial | | Post-washing | |
| Ex. 9 | 100 | 90 | 5− | 4 | 5 | 3 | 3.5 | 3 |
| Ex. 10 | 100 | 90 | 5− | 4− | 5 | 2.5 | 3 | 1 |
| Ex. 11 | 100 | 90 | 5− | 4− | 5 | 3.5 | 3.7 | 3 |
| Ex. 12 | 100 | 90+ | 6 | 4− | 5 | 3.5 | 3.7 | 3 |
| Ex. 1-7 | 100 | 100 | 5+ | 3 | 5 | 5 | 4.5 | 4 |
| Ex. 13 | 100 | 80− | 3 | 0 | 5 | 5− | 5 | 4 |
| Ex. 14 | 100 | 80 | 3 | 0 | 5 | 5− | 5 | 4.5 |

TABLE 6

| | Base cloth Polyester | | | | | | | |
|---|---|---|---|---|---|---|---|---|
| | Water | Oil | Bundesmann test | | | | | |
| Measure | repellency level | | repellency No. | | Initial | | Post-washing | |
| Frequency of washing | 0 | 100 | 0 | 20 | 0 | 0 | 5 | 5 |
| Rainfall testing time (min.) | — | — | — | — | 1 | 20 | 1 | 20 |
| Ex. 1 | 100 | 80 | 6− | 3− | 5 | 5 | 4.5 | 3 |
| Ex. 2 | 100 | 80+ | 6− | 3− | 5 | 5 | 4.5 | 3 |
| Ex. 3 | 100 | 80 | 6− | 3− | 5 | 5 | 5 | 3 |
| Ex. 4 | 100 | 80+ | 6 | 3 | 5 | 5 | 5 | 4 |
| Ex. 5 | 100 | 80+ | 6 | 3 | 5 | 5 | 5 | 4 |
| Ex. 6 | 100 | 80+ | 6− | 3 | 5 | 5 | 5 | 3.5 |
| Ex. 7 | 100 | 90+ | 6− | 4 | 5 | 4 | 5 | 2 |
| Ex. 8 | 100 | 90− | 5 | 4 | 5 | 5 | 5 | 3 |
| Ex. 9 | 100 | 90− | 5 | 4 | 5 | 5 | 5 | 3 |
| Ex. 10 | 100 | 90− | 5 | 5 | 5 | 2.5 | 5 | 1.5 |
| Ex. 11 | 100 | 90+ | 5 | 4 | 5 | 5 | 5 | 3 |
| Ex. 12 | 100 | 90+ | 6− | 4− | 5 | 4 | 5 | 3 |
| Ex. 1-7 | 100 | 80+ | 6− | 3 | 5 | 4 | 5 | 4 |
| Ex. 13 | 100 | 80− | 3 | 0 | 5 | 5− | 5 | 4.5 |
| Ex. 14 | 100 | 80 | 3 | 0 | 5 | 5− | 5 | 4.5 |

INDUSTRIAL APPLICABILITY

The water/oil repellent composition of the present invention is useful as a water/oil repellent agent for fiber products (clothing items (sportswear, coats, blousons, work clothes, uniforms, etc.), bags, industrial materials, etc.), nonwoven fabrics, leather items, stone materials, concrete building materials, etc. It is also useful as a coating agent for filtering materials, organic solvent of which is used in the presence of a liquid or a vapor, a surface-protecting agent, a coating agent for electronics or an antifouling coating agent. Further, it is useful also for an application to give water/oil repellency wherein it is mixed with polypropylene, nylon, etc., and then molded and shaped into fibers.

The entire disclosure of Japanese Patent Application No. 2007-182397 filed on Jul. 11, 2007 including specification, claims and summary is incorporated herein by reference in its entirety.

What is claimed is:

1. A method for producing a water/oil repellent composition, which comprises polymerizing a monomer component comprising the following monomer (a) in coexistence with the following compound (x) in a medium in the presence of a surfactant and a polymerization initiator:
   monomer (a): a compound of the following formula (1):

$$(Z\text{—}Y)_n X \tag{1}$$

wherein Z is a $C_{1-20}$ polyfluoroalkyl group or a group of the following formula (2), Y is —$CH_2$—, —$CH_2CH_2$—, —$(CH_2)_3$—, —$CH_2CH_2CH(CH_3)$—, or —CH=CH—$CH_2$—, n is 1 or 2, and X is one of groups of the following formulae (3-1) to (3-5) when n is 1, or one of groups of the following formulae (4-1) to (4-4) when n is 2;

$$C_i F_{2i+1} O(CFX^1 CF_2 O)_j CFX^2\text{—} \tag{2}$$

wherein i is an integer of from 1 to 6, j is an integer of from 0 to 10, and each of $X^1$ and $X^2$ which are independent of each other, is a fluorine atom or a trifluoromethyl group;

—CR=$CH_2$ (3-1)

—C(O)OCR=$CH_2$ (3-2)

—OC(O)CR=$CH_2$ (3-3)

—OCH$_2$-φ-CR=$CH_2$ (3-4)

—OCH=$CH_2$ (3-5)

wherein R is a hydrogen atom, a methyl group or a halogen atom, and φ represents a phenylene group;

—CH[—$(CH_2)_m$—CR=$CH_2$]— (4-1)

—CH[—$(CH_2)_m$—C(O)OCR=$CH_2$]— (4-2)

—CH[—$(CH_2)_m$—OC(O)CR=$CH_2$]— (4-3)

—OC(O)CH=CHC(O)O— (4-4)

wherein R is a hydrogen atom, a methyl group or a halogen atom, and m is an integer of from 0 to 4;
compound (x): a compound having at least two groups of the following formula (5):

$$\text{—}(CH_2)_a\text{—}CHR^1\text{—}(CH_2)_b\text{—}SH \tag{5}$$

wherein $R^1$ is a methyl group or an ethyl group, a is an integer of from 0 to 2, and b is 0 or 1.

2. The method for producing a water/oil repellent composition according to claim 1, wherein the above Z is a $C_{1-6}$ perfluoroalkyl group.

3. The method for producing a water/oil repellent composition according to claim 1, wherein the above surfactant comprises a nonionic surfactant and a cationic surfactant.

4. The method for producing a water/oil repellent composition according to claim 1, wherein the above polymerization initiator is a radical polymerization initiator.

5. The method for producing a water/oil repellent composition according to claim 1, wherein the above monomer component further contains comprises the following monomer (b):
   monomer (b): a monomer having no polyfluoroalkyl group and having a hydrocarbon group having at least 14 carbon atoms.

6. The method for producing a water/oil repellent composition according to claim 1, wherein the above monomer component further comprises the following monomer (c):
   monomer (c): at least one monomer selected from the group consisting of vinyl halide, vinylidene halide and a monomer of the following formula (6):

$$CH_2=CR^2\text{—}OC(O)R^3 \tag{6}$$

wherein $R^2$ is a hydrogen atom or a methyl group, and $R^3$ is a $C_{1-8}$ alkyl group.

7. The method for producing a water/oil repellent composition according to claim 1, wherein the above monomer component further comprises the following monomer (d):

monomer (d): a monomer having no polyfluoroalkyl group and having a crosslinkable functional group.

8. The method for producing a water/oil repellent composition according to claim 1,
wherein the above monomer component further comprises:
monomer (b): a monomer having no polyfluoroalkyl group and having a hydrocarbon group having at least 14 carbon atoms;
monomer (c): at least one monomer selected from the group consisting of vinyl halide, vinylidene halide and a monomer of the following formula (6):

$$CH_2=CR^2-OC(O)R^3 \qquad (6)$$

wherein $R^2$ is a hydrogen atom or a methyl group, and $R^3$ is a $C_{1-8}$ alkyl group; and
monomer (d): a monomer having no polyfluoroalkyl group and having a crosslinkable functional group, and
wherein the proportions of the respective monomers are such that the monomer (a) is from 10 to 100 mass %, the monomer (b) is from 0 to 90 mass %, the monomer (c) is from 0 to 40 mass %, and the monomer (d) is from 0 to 20 mass %, in the monomer component (100 mass %).

9. The method for producing a water/oil repellent composition according to claim 1, wherein the amount of the compound (x) is from 0.1 to 10 parts by mass, the amount of the surfactant is from 1 to 6 parts by mass, and the amount of the polymerization initiator is from 0.1 to 1.0 parts by mass, per 100 parts by mass of the monomer component.

10. An article treated with the water/oil repellent composition produced by the method defined in claim 1.

11. The method for producing a water/oil repellent composition according to claim 7, wherein monomer (d) is a (meth)acrylate, an acrylamide, a vinyl ether, or a vinyl ester.

12. The method for producing a water/oil repellent composition according to claim 1, wherein compound (x) is selected from the group consisting of ethylene glycol bis(3-mercapto butyrate), diethylene glycol bis(3-mercapto butyrate), butanediol bis(3-mercapto butyrate), trimethylolpropane tris(3-mercapto butyrate), pentaerythritol tetrakis(3-mercapto butyrate), dipentaerythritol hexakis(3-mercapto butyrate), ethylene glycol bis(3-mercapto isobutyrate), diethylene glycol bis(3-mercapto isobutyrate), butanediol bis(3-mercapto isobutyrate), trimethylolpropane tris(3-mercapto isobutyrate), pentaerythritol hexakis(3-mercapto isobutyrate), octanediol bis(3-mercapto isobutyrate), octanediol bis(3-mercapto butyrate), octanediol bis(3-mercapto isobutyrate), 2,4,6-trimercapto triazine, 1,3,5-tris(3-mercapto butyloxyethyl)-1,3,5-triazine-2,4,6(1H,3H,5H)-trione, and 1,3,5-tris(3-mercapto isobutyloxyethyl)-1,3,5-triazine-2,4,6 (1H,3H,5H)-trione.

13. The method for producing a water/oil repellent composition according to claim 1, wherein compound (x) is selected from the group consisting of diethylene glycol bis (3-mercapto butyrate), pentaerythritol tetrakis(3-mercapto butyrate), 2,4,6-trimercapto triazine, and 1,3,5-tris(3-mercapto butyloxyethyl)-1,3,5-triazine-2,4,6(1H,3H,5H)-trione.

14. The method for producing a water/oil repellent composition according to claim 3, wherein the mass ratio of the nonionic surfactant to the cationic surfactant is from 97/3 to 40/60.

15. The method for producing a water/oil repellent composition according to claim 1, wherein monomer (a) is at least one selected from the group consisting of $C_6F_{13}C_2H_4OC(O)C(CH_3)=CH_2$, $C_4F_9C_2H_4OC(O)CCl=CH_2$, and $C_mF_{2m+1}C_2H_4OC(O)CCl=CH_2$ wherein the average of m is 9.

16. The method for producing a water/oil repellent composition according to claim 1, wherein monomer (b) is at least one selected from the group consisting of stearyl acrylate, and behenyl acrylate.

17. The method for producing a water/oil repellent composition according to claim 5, wherein monomer (b) is at least one selected from the group consisting of vinyl chloride and vinylidene chloride.

18. The method for producing a water/oil repellent composition according to claim 7, wherein monomer (d) is at least one selected from the group consisting of an adduct of 3,5-dimethylpyrazole of 2-isocyanatoethyl methacrylate represented by the following formula (7)

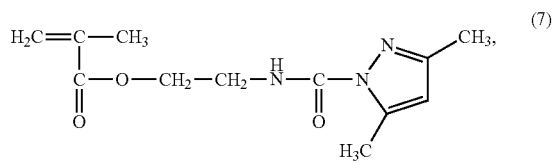

a polycaprolactone ester of hydroxyethyl methacrylates, a polypropylene glycol monomethyacrylate, a polypropylene glycol monoacrylate, a polypropylene glycol-tetramethylene glycol monomethacrylate, and an N-Methylolacrylamide.

19. The method for producing a water/oil repellent composition according to claim 1, wherein the surfactant is at least one selected from the group consisting of a polyoxyethylene/polyoxypropylene/polyoxyethylene block copolymer, a olyoxyethylene/polyoxypropylene/polyoxyethylene block copolymer, an ethylene oxide adduct of acetylene glycol, an ethylene oxide adduct of acetylene glycol, monostearyltrimethylammonium chloride, and coco alkyltrimethylammonium chloride.

20. The method for producing a water/oil repellent composition according to claim 1, wherein the polymerization initiator is a 10 mass % aqueous solution of acetate of 2,2'-azo-bis[2-(2-imidazolin-2-yl)propane].

* * * * *